United States Patent
Dabholkar

(10) Patent No.: US 8,630,764 B2
(45) Date of Patent: Jan. 14, 2014

(54) SYSTEM OPERATION FOR TELEMATICS SYSTEMS THAT USE A BATTERY

(75) Inventor: Harsha M. Dabholkar, Libertyville, IL (US)

(73) Assignee: Continential Automotive Systems, Inc., Auburn Hills, MI (US)

( * ) Notice: Subject to any disclaimer, the term of this patent is extended or adjusted under 35 U.S.C. 154(b) by 66 days.

(21) Appl. No.: 13/310,039

(22) Filed: Dec. 2, 2011

(65) Prior Publication Data

US 2013/0144483 A1 Jun. 6, 2013

(51) Int. Cl.
*G06F 7/00* (2006.01)

(52) U.S. Cl.
USPC .......................... 701/32.4; 701/32.3

(58) Field of Classification Search
USPC ................................ 701/32.4, 32.3
See application file for complete search history.

(56) References Cited

U.S. PATENT DOCUMENTS

| | | | |
|---|---|---|---|
| 7,492,293 B2* | 2/2009 | Short et al. | 341/123 |
| 7,596,366 B2* | 9/2009 | Van Bosch et al. | 455/343.2 |
| 2004/0127265 A1 | 7/2004 | VanBosch et al. | |
| 2006/0052092 A1* | 3/2006 | Schwinke et al. | 455/415 |
| 2008/0319665 A1* | 12/2008 | Berkobin et al. | 701/213 |
| 2009/0224869 A1* | 9/2009 | Baker et al. | 340/5.1 |
| 2010/0179897 A1 | 7/2010 | Gafford et al. | |
| 2011/0130905 A1* | 6/2011 | Mayer | 701/22 |
| 2011/0235891 A1* | 9/2011 | Sonnemans et al. | 382/133 |
| 2012/0016551 A1* | 1/2012 | Krause et al. | 701/29 |

FOREIGN PATENT DOCUMENTS

DE 19733579 A1 2/1999

OTHER PUBLICATIONS

International Search Report and Written Opinion dated Feb. 22, 2013, from corresponding International Patent Application No. PCT/US2012/062922.

* cited by examiner

*Primary Examiner* — Mary Cheung
*Assistant Examiner* — Michael Berns

(57) ABSTRACT

A vehicle telematics system repeatedly reports vehicle status, including the location of a stolen vehicle. As wireless reports are transmitted over time, battery capacity will decrease if the engine is not running. As the vehicle battery capacity decreases over time, status reports are adjusted to extend battery life and therefore the time over which at least some vehicle status information can be obtained.

17 Claims, 2 Drawing Sheets

SYSTEM OPERATION FOR TELEMATICS SYSTEMS THAT USE A BATTERY

BACKGROUND

In a telematics system, an embedded wireless phone or other wireless communications device referred to herein as a network access device or "NAD" is used to periodically report the status of the vehicle to a telematics service provider. Vehicle status includes various operational parameters but it also includes whether the vehicle might be stolen and if so, the vehicle's current location becomes an important piece of status information.

Vehicle location is usually determined by a global position system or GPS within the vehicle. Vehicles equipped with telematics capability are typically configured to provide the location of the vehicle to the service provider. Knowing the location of a stolen vehicle at all times significantly improves the likelihood that it will be recovered. Unfortunately, the ability to continuously report a vehicle's location is dependent on the vehicle's battery. Once the battery goes dead, communications with the vehicle will be lost.

DETAILED DESCRIPTION

Figure 1:
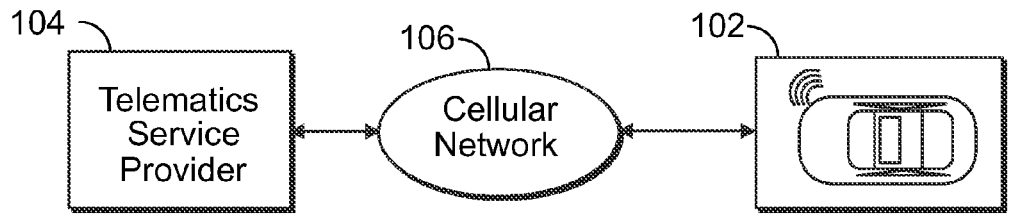
FIG. 1 is a block diagram of a telematics system.

FIG. 1 is a block diagram of a telematics system 100 for a vehicle and which is capable of tracking vehicle location and vehicle usage. A motor vehicle 102 equipped with a Global Positioning System (GPS) receiver (not shown) and a cellular telephone or equivalent communication device (not shown) exchanges data with a telematics service provider 104 via a cellular network 106. The cellular network 106 thus acts as a relay agent transferring information from the vehicle 102 to the telematics service provider 104.

The information sent to the telematics service provider 104 includes, but is not limited to, the location of the vehicle 102, which is preferably determined by the vehicle's on-board GPS system but in an alternate embodiment is computed by dead reckoning or a inertial navigation system. The information sent to the telematics service provider 104 can also include the status of the vehicle, such as a report to the telematics service provider 104 that the vehicle's air bags deployed, a crash sensor has been actuated or a mechanical component or system failed. For purposes of this disclosure, the information sent to the telematics service provider 104 certainly includes a notice that the vehicle has been stolen or is being used by an unauthorized operator but it can also include information regarding a crash or other event that warrants an emergency message. In the case of a vehicle being stole, the telematics service provider 104 typically notifies law enforcement agencies that are proximate to, or which have law enforcement jurisdiction where the car reports its location from information obtained from or provided by the GPS system.

Figure 2:
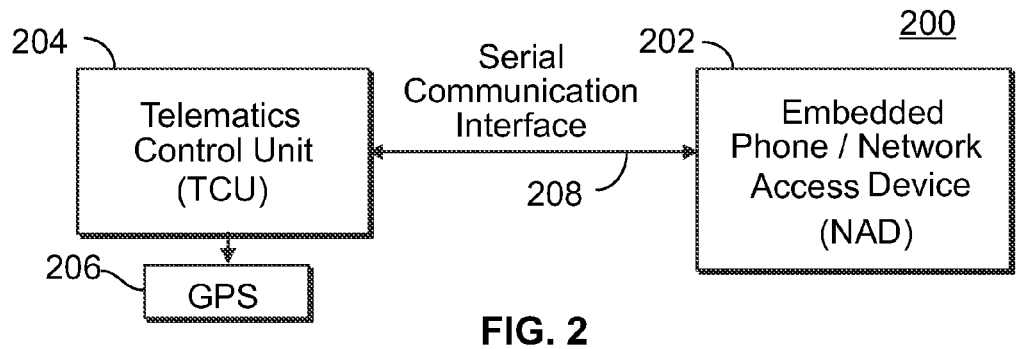
FIG. 2 is a block diagram of the vehicle portion of the telematics system shown in FIG. 1.

FIG. 2 is a block diagram of the vehicle portion 200 of the telematics system shown in FIG. 1. The telematics system 200 is comprised of an embedded cell phone or network access device 202 configured to communicate wirelessly with a network, such as the cellular network 106 depicted in FIG. 1. The preferred network access device 202 is embodied as a conventional cellular phone, however, alternate embodiments can employ a trunked radio system or an I.E.E.E. 802.11-compliant transmitter, and derivatives thereof.

In the vehicle, the embedded phone/network access device or "NAD" 206 communicates with a telematics control unit or "TCU" 204 via a serial communication interface 208 or a conventional bus. Information passed to the NAD 202 from the telematics control unit 204 is wirelessly communicated to the telematics service provider 104.

Information that the telematics control unit 204 conveys to the telematics service provider 104 via the NAD 202 includes location information obtained from a GPS or global positioning system 206. The telematics control unit 204 will also include interfaces to other vehicle systems that enable the telematics control unit 204 to determine whether the vehicle has been in a collision, it has been stolen, or it needs service.

Figure 3:
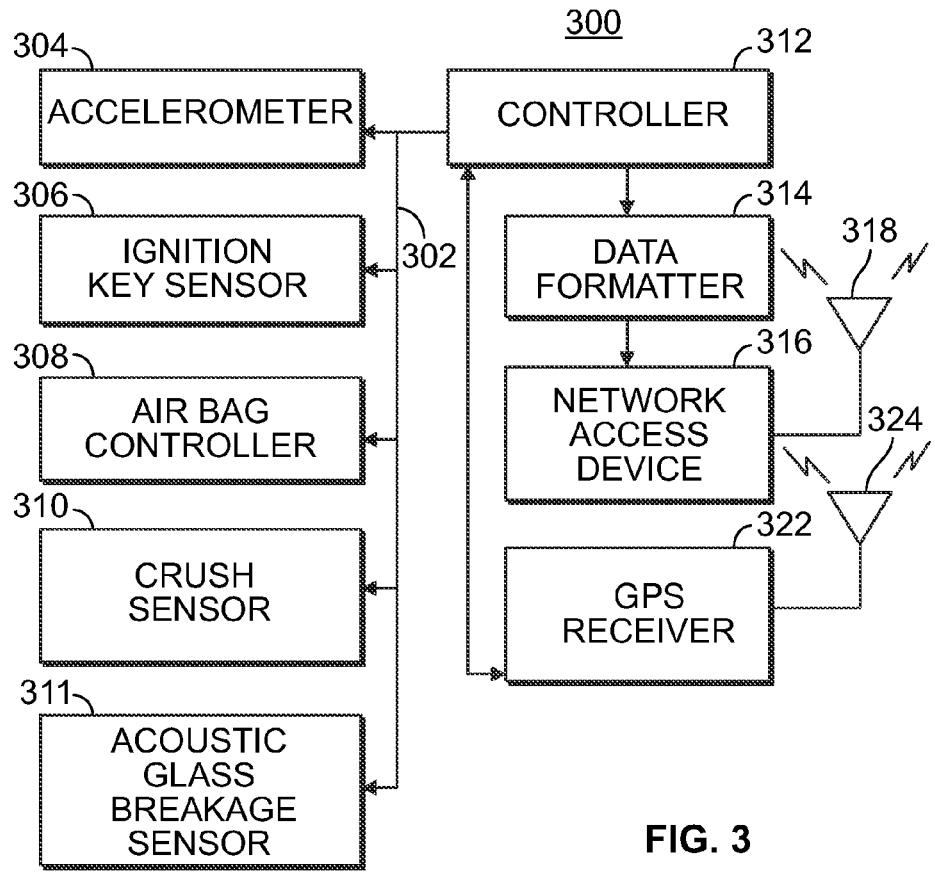
FIG. 3 is a block diagram of the vehicle portion shown in FIG. 2.

FIG. 3 is a block diagram of a vehicle telematics system 300. A computer or controller 312 is coupled to various sensors via a conventional bus 302. The bus 302 couples the controller 312 to an accelerometer 304, which is configured to detect a vehicle collision or the motion of a vehicle or an inclination angle for the vehicle suggestive or indicative of the vehicle being towed. An ignition key sensor 306, air bag controller 308, sensor 310 and acoustic glass breakage sensor 311, provide indications of the vehicle being stolen, damaged or tampered with.

Information collected by the controller 312 is provided to a data formatter 314. The data formatter 314 converts the data that it receives from the controller 312 to a format suitable for wireless transmission to the telematics service provider by a network access device (NAD) 316, such as a cell phone or equivalent thereof. In one embodiment, the data formatter 314 formats the data as required by the telematics communication protocol e.g. ACP (Application Communication Protocol).

The data formatter 314 provides the re-formatted vehicle status data to a network access device 316. Vehicle location is determined by a GPS receiver 322, which receives GPS signals from its own antenna 324. The GPS-determined location is provided to the controller 312. The controller 312 provides the vehicle-location data to the data formatter 314. The data formatter 314 provides the vehicle status and vehicle location information to a vehicle-located network access device 316 for transmission from a corresponding antenna 318. Signals emitted from the antenna 318 are received by cellular or other type of communications network 106, which are then forwarded to the telematics service provider 104.

The system depicted in FIGS. 1-3 is configured to repeatedly and autonomously report an unusual vehicle status to the telematics service provider. An unusual vehicle status includes the vehicle's theft. A problem with autonomic reporting is that the devices in the vehicle are battery powered. If the engine is not running to maintain the battery's charge, the battery will inevitably discharge, i.e., go dead, over time. Once the battery has gone dead, recovering the vehicle becomes unlikely. An improved system for a telematics system that uses a battery, adjusts or modifies operation of the system over time, in order to prolong or extend battery life, without significantly compromising system efficacy.

Figure 4:
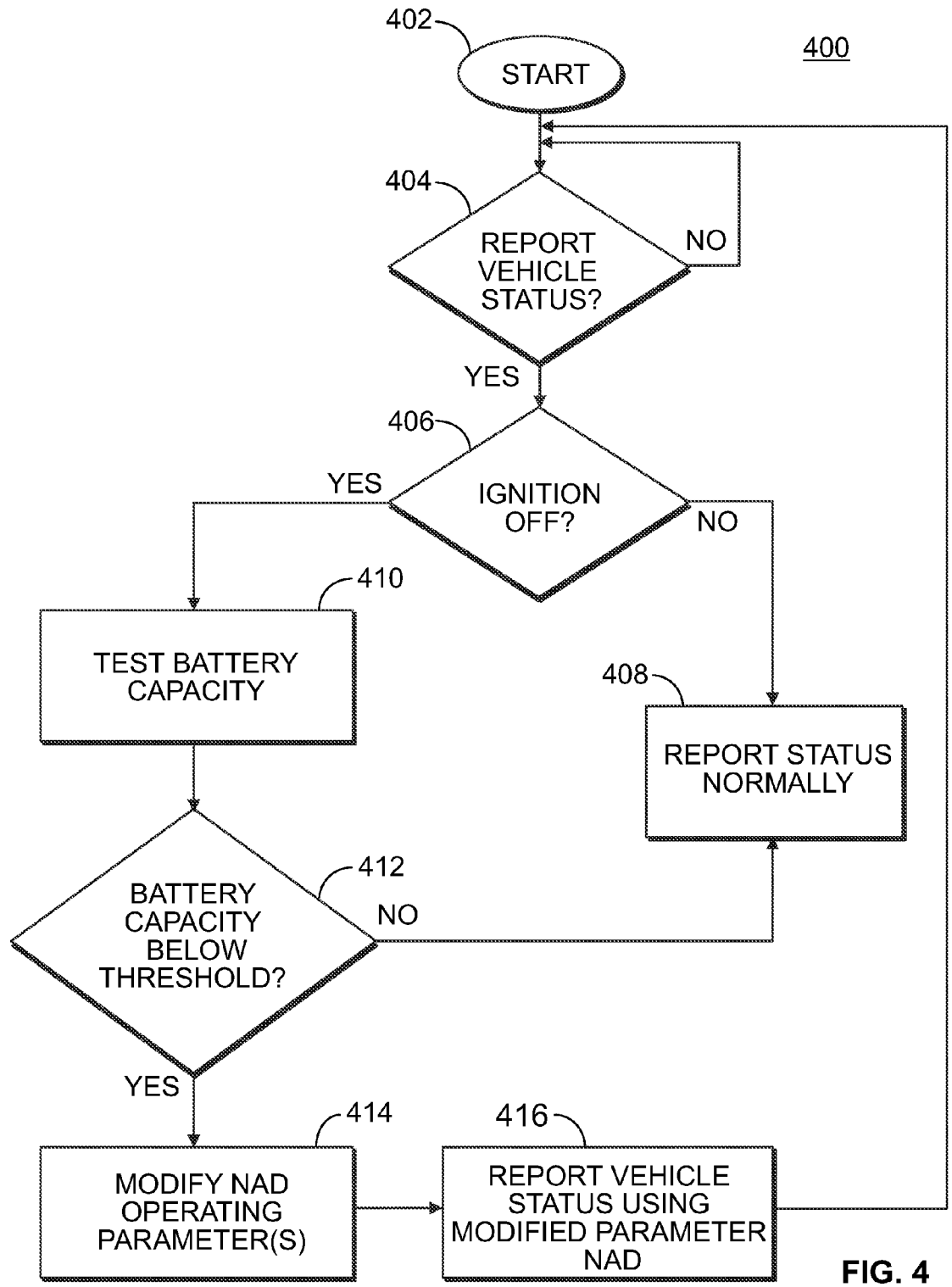
FIG. 4 is a block diagram of a method of extending or improving the operation of a battery-powered telematics system.

FIG. 4 is a block diagram of a method of extending or improving the operation of a battery-powered telematics system. Program execution starts at step 402, which occurs when the telematics control unit 204 has determined the need to report vehicle location or some other information to a telematics service provider 104 using the embedded phone/network access device 202. Such a determination is made in step 404 and can include but is not limited to events such as the indicated theft of the vehicle, e.g., an inclination angle of the chassis coupled with a detected glass breakage and wheel rotation with the ignition off.

At step 406, the method includes the step of checking to determine whether the vehicle ignition is off. If the vehicle ignition is on, the method assumes that the engine is running. If the engine is running, the battery charge will almost certainly be maintained; that there is no need to adjust system operation. The vehicle status is thus reported normally in step 408. Program control thereafter returns to step 404 where the vehicle telematics control unit 204 continuously and repeatedly reports the vehicle status to the telematics service provider 104.

If at step 406 the method determines that the ignition of the vehicle is off, a battery capacity test is performed at step 410. If the battery capacity is determined to be above a predetermined threshold, say for example, 90 to 95 percent of its ordinary capacity, the status of the vehicle is reported normally at step 408. If it is determined at step 412 that the battery capacity is below a predetermined threshold, the operation of one or more parameters of the imbedded phone/network access device 202 is modified in step 414.

After the network access device or NAD is modified at step 414, the vehicle status is nevertheless reported at step 416 but using the modified-parameter network access device.

Operation of the network access device can be modified in several ways that will reduce battery drain yet provide at least some periodic vehicle reports to the telematics service provider 104. First and foremost is reducing the reporting rate, which is the number of reports per unit time at which notifications are provided by the TCU to the telematics service provider.

In addition to reducing the rate or frequency at which notification are sent, the data transmitted from the NAD 202 can be sent at a slower packet rate, i.e., the rate or frequency at which individual packets of data are sent, is reduced. Those of ordinary skill in the art will recognize that the number of packets per unit time that are sent by a radio frequency transmitter will directly affect the amount of power required to do so. Reducing a packet data rate or baud rate thus reduces battery drain.

In addition to sending packets at a slower rate, i.e., fewer packets per unit time, the nominal bit rate at which the individual bits of each packet are sent can also be reduced. Reducing the bit rate will reduce battery drain.

Some prior art telematics systems provide voice communications, an example of which is the OnStar™ system. Such systems encode analog voice signals into a digital format for transmission onto a digital communications systems. Battery drain can be reduced by reducing the rate at which voice is sampled and encoded to a digital form for transmission. Similarly, different algorithms by which voice is encoded will also require less power and therefore less battery drain.

In yet another embodiment, the TCU 204 can reduce the time between successive computations of the vehicle's location by the GPS system 206. Reducing the time between location computations will reduce the resolution or granularity of the vehicle's location in the reports that it sends but will nevertheless reduce the rate at which the GPS system 206 requires power from the battery.

Finally, battery drain can be reduced if the network access device or NAD is changed to reduce the rate at which it attempts to register with a cellular network. Those of ordinary skill in the cellular communications arts will recognize that when cellular telephone is powered up, the first thing it attempts to do is register with a cellular network. Each registration attempt requires transmitter power from the cellular radio. Reducing the number of attempts to register with a network, when a detectable signal from a cellular network is not available, will significantly reduce the power required from the battery. Examples of reduced registration attempts would be when the vehicle is in a tunnel or a building and not able to receive signals from a cellular network.

The foregoing description is for purposes of illustration only. The true scope of the invention is set forth in the pertinent claims.

What is claimed is:

1. A vehicle telematics system for a vehicle, the system comprising:
a telematics control unit (TCU), operatively coupled to a wireless network access device (NAD) and a global positioning system (GPS), the TCU, NAD and GPS being attached to the vehicle and capable of being powered by a battery, the TCU, GPS and NAD being configured to repeatedly and autonomously transmit vehicle status to a telematics service provider and, effectuate substantially continuous reporting of vehicle status information via the NAD at a first reporting rate according to a first NAD operating parameter, as long as the battery has a charge level above a predetermined threshold, at least one of the TCU, GPS and NAD being additionally configured to continue to effectuate a repeated, autonomous and substantially continuous reporting of the vehicle status information by transmitting the vehicle status information at a second, reduced reporting rate according to a modified NAD operating parameter responsive to a determination that the battery charge level is below the predetermined threshold.

2. The vehicle telematics system of claim 1, wherein at least one of the TCU, and NAD is configured to reduce a frequency at which vehicle status information is transmitted from the NAD responsive to a determination that the battery charge level is below the predetermined threshold, the first reporting rate being a first frequency at which vehicle status information is transmitted, the second reporting rate being a second, reduced frequency at which vehicle status information is transmitted.

3. The vehicle telematics system of claim 1, further comprising a data formatter, coupled to the telematics control unit and configured to receive data to be transmitted from the NAD, the data formatter being additionally configured to format data into a format required by the NAD, and wherein vehicle information status reports are sent as data packets, the data packets being transmitted from the NAD at a bit rate, the first reporting rate being a first bit rate, the second reporting rate being a slower bit rate.

4. The vehicle telematics system of claim 1, further comprising a data formatter, coupled to the telematics control unit and configured to receive data to be transmitted from the NAD, the data formatter being additionally configured to format data received from the telematics control unit into a telematics communication protocol.

5. The vehicle telematics system of claim 1, wherein the NAD is configured to transmit vehicle status information in data packets, said data packets being transmitted at a changeable number of packets per unit time, and wherein the NAD is configured to reduce the number of data packets per unit time responsive to the battery capacity being below the predetermined threshold, the first reporting rate being a first number of data packets per unit time, the second reporting rate being a lesser number of data packets per unit time.

6. The vehicle telematics system of claim 1, wherein vehicle status information comprises vehicle location information obtained from the GPS and wherein the vehicle telematics system is configured to adjust a rate per unit time at which the GPS computes and provides a location to the telematics control unit, responsive to the battery charge level being below the predetermined threshold.

7. The vehicle telematics system of claim 1, wherein the NAD is configured to provide voice communications and to convert voice signals to a digital format using a sampling rate and wherein the NAD is additionally configured to change the sampling rate responsive to the battery charge level being below the predetermined threshold.

8. The vehicle telematics system of claim 1, wherein the NAD is configured to provide voice communications and is configured to convert voice signals to a digital format using at least two different coding algorithms and wherein the NAD is additionally configured to select a coding algorithm responsive to the battery charge level being below the predetermined threshold.

9. The vehicle telematics system of claim 1, wherein the NAD is a cellular-type communications device configured to register itself with a cellular-type network, the NAD being configured to adjust registration attempts responsive to detecting a signal from a cellular network.

10. The vehicle telematics system of claim 1, wherein the NAD is a trunked radio communications device.

11. The vehicle telematics system of claim 1, wherein the NAD is an I.E.E.E. 802.11-compliant communications device.

12. A method of reducing power consumption in a battery-powered telematics system providing wireless location-based services using a wireless communications device, the method comprising:
   continuously and repeatedly reporting vehicle status to a telematics service provider before and after selectively changing at least one operating characteristic of the wireless communications device responsive to battery charge level decreasing below a predetermined threshold, a changed operating characteristic causing the battery powered telematics system to send vehicle status information at a reduced rate.

13. The method of claim 12, wherein the battery-powered telematics system is coupled to a vehicle having an engine and a battery having a charge level, the charge level of the battery capable of being maintained by operation of the engine, the method further comprising the step of:
   detecting whether the engine is operating and thereafter detecting the battery charge level.

14. The method of claim 13, wherein battery-powered telematics system is comprised of a wireless communications device operatively coupled to, and providing wireless communications capability to a telematics system, the wireless communications device being configured to provide information to the telematics system, wherein the changeable operating characteristics comprising:
   a time between successive transmissions to and from the telematics system; and
   a bit rate at which transmission are provided to and from the telematics system.

15. The method of claim 13, wherein the wireless communications device is configured to transmit signals comprised of at least one of: data and voice, and wherein changeable operating characteristics of the wireless communications device comprise:
   a time between successive signal transmissions;
   a bit rate at which data for a data message is transmitted;
   a sampling rate at which voice is encoded to a digital form;
   an algorithm by which voice is encoded into a digital form.

16. The method of claim 12, wherein the telematics system is additionally comprised of a global position system and wherein the telematics system repetitively computes a location of the telematics system and repetitively transmits said computed location, wherein the step of selectively changing at least one operating characteristic further comprises:
   changing the time between successive computations of the telematics system location; and
   changing the time between successive transmissions of a computed location;
   based on a charge of the battery.

17. The method of claim 12, wherein the wireless communications device is a cellular phone, wherein the changeable operating characteristics include:
   changing the rate at which the cellular phone attempts to register with a cellular network responsive to the presence of a detectable signal from a cellular network, responsive to a charge of the battery.

* * * * *